J. LEVY.
HANDLE FOR JOINTED CONTAINERS.
APPLICATION FILED FEB. 6, 1918.
1,269,470.
Patented June 11, 1918.
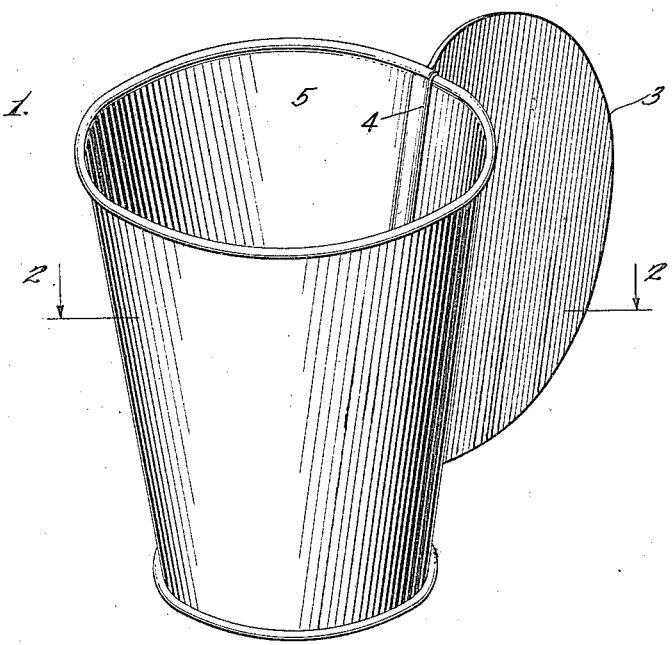
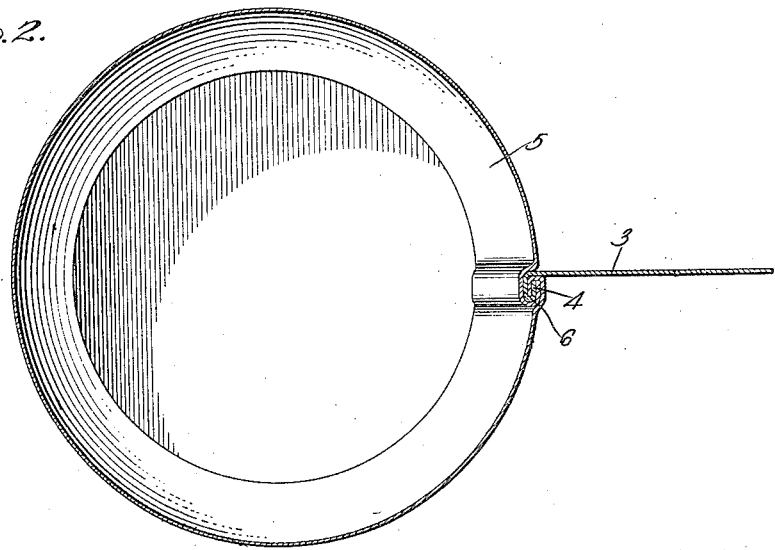

UNITED STATES PATENT OFFICE.

JOSEPH LEVY, OF BROOKLYN, NEW YORK.

HANDLE FOR JOINTED CONTAINERS.

1,269,470. Specification of Letters Patent. Patented June 11, 1918.

Application filed February 6, 1918. Serial No. 215,586.

*To all whom it may concern:*

Be it known that I, JOSEPH LEVY, a citizen of the United States, and a resident of the city of New York, borough of Brooklyn, in the county of Kings and State of New York, have invented a new and Improved Handle for Jointed Containers, of which the following is a full, clear, and exact description.

My invention relates to containers having a single lock seam and which have a handle connected to the container at the seam by infolding a portion of said handle in the seam.

An object of the invention is to provide a simple and inexpensive container particularly suitable for granular material.

I attain the above and other objects of my invention by the structure conventionally disclosed in the accompanying drawings, wherein similar characters of reference indicate corresponding parts in both views.

Figure 1 is a perspective view of a container provided with a handle embodying my invention; and Fig. 2 is a horizontal section on line 2—2, Fig. 1.

To provide an inexpensive and strong handle for a container I make the handle of sheet metal similar to that of the container and infold one edge of the handle in the seam of the container.

As shown in the drawings, 3 is the handle which extends out of the seam 4 of the container 5. The seam of the container is a single lock seam which grips the double fold 6 of the edge of the handle infolded by the seam 4 of the container 5. This infolding of the edge of the handle 3 makes a stronger seam and also renders the sheet metal forming the handle sufficiently rigid to permit the proper handling of the container by the handle. Although the drawing shows a single lock seam which locks the handle, a double lock seam may be used if so desired.

By attaching the handle to the seam of the container a single operation completes the seam of the container and the joining of the handle to the container. It will be noted that the single lock seam is disposed longitudinally of the container; therefore the joining of the handle with the container is also longitudinal and, in consequence, the handle will support any load that the container is able to carry, due to the fact that the stress is in the plane of the handle.

Although the drawing shows the container in the shape of a cup principally intended for use as a child's toy, the construction is by no means limited in size or shape and can be as advantageously used with large size containers as with small ones as illustrated.

I claim:

In combination with a container having a longitudinal single lock seam, a handle having a portion of same infolded by the single lock seam and whereby said handle is secured to the container at the seam, said handle having the infolded portion extending substantially through the length of the seam of the container.

JOSEPH LEVY.

Copies of this patent may be obtained for five cents each, by addressing the "Commissioner of Patents, Washington, D. C."